(12) United States Patent  
Ushida et al.

(10) Patent No.: US 8,532,440 B2  
(45) Date of Patent: Sep. 10, 2013

(54) SILICON-BASED ELECTRO-OPTIC DEVICE

(75) Inventors: Jun Ushida, Minato-ku (JP); Junichi Fujikata, Minato-ku (JP); Ming-Bin Yu, Singapore (SG); Liang Ding, Singapore (SG); ShiYang Zhu, Singapore (SG)

(73) Assignee: NEC Corporation, Tokyo (JP)

( * ) Notice: Subject to any disclaimer, the term of this patent is extended or adjusted under 35 U.S.C. 154(b) by 224 days.

(21) Appl. No.: 13/036,244

(22) Filed: Feb. 28, 2011

(65) Prior Publication Data

US 2011/0211786 A1 Sep. 1, 2011

(30) Foreign Application Priority Data

Mar. 1, 2010 (SG) ................. 201001336-5

(51) Int. Cl.  
*G02F 1/025* (2006.01)  
*G02F 1/035* (2006.01)

(52) U.S. Cl.  
USPC ........... 385/2; 385/3; 385/8; 385/14; 385/131

(58) Field of Classification Search  
USPC ........ 385/1–4, 8, 9, 14, 40, 129–132  
See application file for complete search history.

(56) References Cited

U.S. PATENT DOCUMENTS

| | | | | |
|---|---|---|---|---|
| 6,298,177 | B1 * | 10/2001 | House | 385/3 |
| 6,845,198 | B2 * | 1/2005 | Montgomery et al. | 385/50 |
| 7,046,896 | B1 * | 5/2006 | Gunn et al. | 385/131 |
| 7,136,544 | B1 * | 11/2006 | Gunn et al. | 385/3 |
| 7,280,712 | B2 * | 10/2007 | Liu | 385/3 |
| 7,447,395 | B2 * | 11/2008 | Montgomery et al. | 385/14 |
| 7,711,212 | B2 * | 5/2010 | Green et al. | 385/1 |

FOREIGN PATENT DOCUMENTS

WO 2004/088394 A2 10/2004

OTHER PUBLICATIONS

T. Pinguet, et al., "A 1550 nm, 10 Gbps optical modulator with integrated driver in 130 nm CMOS", Proc. of Group Four Photonics, 2007, pp. 186-189, ThA2.

A. Liu, et al., "High-speed optical modulation based on carrier depletion in a silicon waveguide", Optics Express, 2007, pp. 660-668, vol. 15, No. 2.

* cited by examiner

*Primary Examiner* — Daniel Petkovsek  
(74) *Attorney, Agent, or Firm* — Sughrue Mion, PLLC

(57) ABSTRACT

In an electro-optic device, a stack structure including a first silicon layer of a first conductivity type and a second silicon layer of a second conductivity type has a rib waveguide shape so as to form an optical confinement area, and a slab portion of a rib waveguide includes an area to which a metal electrode is connected. The slab portion in the area to which the metal electrode is connected is thicker than a surrounding slab portion. The area to which the metal electrode is connected is set so that a range of a distance from the rib waveguide to the area to which the metal electrode is connected is such that when the distance is changed, an effective refractive index of the rib waveguide in a zeroth-order mode does not change.

4 Claims, 4 Drawing Sheets

SILICON-BASED ELECTRO-OPTIC DEVICE

This application is based upon and claims the benefit of priority from Singapore patent application No. 201001336-5, filed on Mar. 1, 2010, the disclosure of which is incorporated herein in its entirety by reference.

BACKGROUND OF THE INVENTION

1. Field of the Invention:

The present invention relates to an electro-optic device formed on a silicon platform and utilized in the field of, for example, optical communication, and in particular, to a silicon-based electro-optic device formed on an SOI (Silicon-On-Insulator) substrate.

2. Description of the Related Arts:

Information communication networks typified by the Internet are constructed so as to spread throughout the world as social infrastructure essential for peoples' lives. Optical communication using optical fibers is a technique to support huge traffics on the Internet. Optical communication devices using silicon platforms can utilize a 1.3-µm band and a 1.55-µm band of wavelengths, which are included in the wavebands used for optical fiber communication. Furthermore, these optical communication devices can be manufactured by a CMOS (Complementary Metal-Oxide-Semiconductor) device fabricating processes. Thus, the optical communication devices are expected to implement high-density optical integrated circuits.

Increasing an information transmission rate per channel is a method for dealing with traffic on information communication networks, which increase year by year. An optical modulator is important for implementing this method; the optical modulator quickly converts electric signals from an LSI (Large-Scale Integration) circuit into optical signals. The LSI circuit processes information in an optical communication device. Thus, implementation of the optical modulator on a silicon platform has been proposed.

A typical proposed optical modulator is of a type that utilizes a carrier plasma effect to change the refractive index of a silicon material and thus to change propagation characteristics of light. For example, A. Liu et al. have proposed a silicon-based optical modulator using a pn junction and operated with reverse bias [A. Liu, et al., "High-speed optical modulation based on carrier depletion in a silicon waveguide," OPTICS EXPRESS, vol. 15, no. 2, pp. 660-668 (2007)]. T. Pinguet et al. have proposed a silicon-based optical modulator compatible with fabricating processes of CMOS devices [T. Pinguet, el al., "A 1550 nm, 10 Gbps optical modulator with integrated driver in 130 nm CMOS," Proc. of Group Four Photonics, ThA2, pp. 186-189 (2007)]. Both of these optical modulators can operate at high speed.

FIG. 1 shows the sectional structure of the optical modulator proposed by Liu et al. FIG. 1 shows a cross section of the optical modulator taken on a surface that is perpendicular to the direction in which light propagates. In the optical modulator, oxide layer 25 is formed on the top surface of silicon substrate 24, and p-doped silicon layer 23 that is an SOI layer is provided on oxide layer 25. In this case, p-doped silicon layer 23 is formed such that the sectional structure thereof includes a projecting portion serving as a core of a rib optical waveguide and slab portions arranged on the respective opposite sides of the projecting portion and connected to the projecting portion. To establish an electric connection between p-doped silicon layer 23 and electrode 27, $p^{++}$-doped silicon layer 22 to which a p-type dopant of a high concentration is introduced is provided so as to connect to each of the slab portions.

On p-doped silicon layer 23, n-doped silicon layer 21 is formed such that p-doped silicon layer 23 and n-doped silicon layer 21 form a pn junction. A side portion of n-doped silicon layer 21 is connected to $n^{++}$-doped silicon layer 20 to which an n-type dopant of a high concentration is introduced so as to be electrically connected to electrode 28. A portion of n-doped silicon layer 21 which contacts p-doped silicon layer 23 also forms a part of the rib waveguide. Such n-doped silicon layer 21 is formed by epitaxially growing a silicon layer on the SOI layer (i.e., p-doped silicon layer 23) and doping n-type impurities down to the vicinity of the interface between the epitaxially grown layer and the SOI layer.

Oxide layer 35 also functioning as a clad layer of the waveguide is provided so as to entirely cover p-doped silicon layer 23, $p^{++}$-doped silicon layer 22, n-doped silicon layer 21, and $n^{++}$-doped silicon layer 21.

In such an optical modulator, a reverse bias voltage is applied to between p-doped silicon layer 23 and n-doped silicon layer 21 via electrodes 27 and 28. Then, owing to the carrier plasma effect, a modulation operation is performed on light passing through p-doped silicon layer 23 and n-doped silicon layer 21, which form the rib waveguide.

If the optical modulation portion has such a structure, the shape of the optical modulation portion and the external electrode portion connected to the optical modulation portion is different from the structure of the waveguide connected to the electrodes. Thus, a connection structure needs to be formed which optically couples the optical modulation portion and the external electrode portion to the waveguide structure with a reduced loss and which enables high-speed electric responses.

Furthermore, in the structure shown in FIG. 1, light is confined in the rib waveguide. However, if there is only a short distance from $p^{++}$-doped silicon layer 22 connected to the slab of the rib waveguide to the main body of the rib waveguide, optical absorption by the $p^{++}$-doped silicon may disadvantageously result in a loss. Specifically, the $p^{++}$-doped silicon has a higher optical absorbance than $p^{+}$-doped silicon or pure silicon (or intrinsic silicon), which has a lower dopant concentration. Thus, the $p^{++}$-doped silicon cannot be used in the central portion of the rib waveguide. Besides the central portion of the rib waveguide, the vicinity of the rib structure is not preferable as a position where the $p^{++}$-doped silicon is placed, in terms of a reduction of optical loss.

On the other hand, to allow the optical modulator to operate at high speed, the electrodes are desirably arranged near the rib structure to reduce electric resistance associated with the electrodes. Hence, arranging the electrodes near the rib waveguide in order to increase the speed of the electro-optic device is in a tradeoff relationship with arranging the electrodes away from the rib waveguide in order to reduce an optical loss in the electro-optical device.

In the configuration in which electrode 27 is connected to $p^{++}$-doped silicon layer 22 as shown in FIG. 1, the following problem may occur if the thickness of $p^{++}$-doped silicon layer 22 is reduced in order to enhance confinement of light in the rib waveguide structure to increase efficiency. That is, a manufacturing variation is likely to occur in the thickness of a silicide layer serving as a contact layer between electrode 27 and $p^{++}$-doped silicon layer 22. This makes a contact resistance unstable.

In the optical modulator shown in FIG. 1, a pn junction is formed. However, WO2004/088394 discloses an example of a silicon-based electro-optic modulator in which a SIS (Semiconductor-Insulator-Semiconductor) junction is formed instead of the pn junction. This optical modulator has a waveguide structure in which a p-doped silicon layer and an n-doped silicon layer are stacked via a relatively thin dielectric layer. When a modulation signal is applied to between the two silicon layers, free carriers are accumulated or removed or the carrier concentration is reversed, on the respective opposite sides of the dielectric layer. This changes an effective optical refractive index.

FIG. 2 shows the sectional structure of the optical modulator proposed by Pinguet et al. FIG. 2 shows a cross section of the optical modulator taken across a surface perpendicular to the direction in which light propagates. This optical modulator also includes a rib waveguide of an SOI structure but is different from the one shown in FIG. 1 in that a p-doped silicon layer and an n-doped silicon layer are arranged so as to form a lateral pn junction along a centerline extending in the longitudinal direction of the rib waveguide such that the plane of the pn junction is perpendicular to the silicon substrate. Each of the doped silicon layers has a low impurity concentration in the rib waveguide portion. In the slab portion of the rib waveguide, the impurity concentration increases with the distance from the rib waveguide. Pinguet et al. fail to fully describe the specific structure of the optical modulator. However, $p^+$-doped silicon layer 32 and $n^+$-doped silicon layer 30 have larger thicknesses at each position in the slab portion where the slab portion contacts the electrode. In this structure, a stable silicide layer is expected to be formed so as to serve as a contact layer.

In the optical modulator or electro-optic device including the rib waveguide of the SOI structure, it is completely unclear how close the contact layer is to be located with respect to the rib waveguide for a high speed operation and how, in association with connection to the electrode, the contact layer is to be located with respect to the central portion of the waveguide, through which light passes. Furthermore, silicon blocks provided on the slab portions on the respective opposite sides of the rib waveguide may cause a propagation loss or an insertion loss resulting from stray light.

SUMMARY OF THE INVENTION

As one of silicon-based electro-optic devices that can be integrated on a silicon (Si) semiconductor substrate, the optical modulator based on the carrier plasma effect can realize, in a very small size of submicron order, a reduction in costs, reduction of current density, reduction of power consumption, a high modulation degree, driving at a reduced voltage and high speed modulation. However, as described above, it is difficult to achieve an efficient optical connection for such an optical modulator based on the carrier plasma effect by adjusting the arrangement of the electrode contact layer. Furthermore, a manner of arranging the electrode contact layer which enables both the high-speed operation and a reduction in optical propagation loss in the optical modulator is unknown.

An electrode connection structure which achieves an efficient optical connection and which enables both high-speed operations and a reduction in optical propagation loss has been demanded in a silicon-based optical modulator formed on an SOI substrate.

According to an exemplary aspect of the present invention, an electro-optic device includes: a silicon body region doped to exhibit a first conductivity type; a silicon gate region doped to exhibit a second conductivity type, the silicon gate region being disposed at least in part over the silicon body region to define a contiguous area between the silicon body region and the silicon gate region; a dielectric layer disposed in the contiguous area between the silicon body region and the silicon gate region, the combination of the silicon body region and the silicon gate region with the interposed dielectric layer defining an active region of the electro-optic devices; a first electrical contact coupled to the silicon gate region; and a second electrical contact coupled to the silicon body region, wherein upon application of an electrical signal to the first electrical contact and the second electrical contact, free carriers accumulate, deplete or invert within the silicon body region and the silicon gate region on both sides of the dielectric layer at the same time, such that an optical electric field of the optical signal substantially overlaps with a modulation area of free carrier concentration in the active region of the electro-optic device, a rib waveguide is formed by means of the silicon body region, the silicon gate region and the dielectric layer, a first electrical contact is coupled to a slab part of the rib waveguide, the rib part has a region coupled to an electrode contact region where thickness of the electrode contact region of rib part is thicker than around rib part, and a position of the electrode contact region of the rib part is located at a position of center of the waveguide where an effective index value of the rib waveguide in a zeroth-order mode is constant when the distance between rib waveguide and the electrode contact region varies.

According to another exemplary aspect of the present invention, an electro-optic device includes a first silicon layer of a first conductivity type, a second silicon layer of a second conductivity type different from the first conductivity type, the second silicon layer being at least partly stacked on the first silicon layer, a dielectric layer formed at an interface between the first silicon layer and the second silicon layer, a first electric contact connected to the first silicon layer, and a second electric contact connected to the second silicon layer, wherein the first silicon layer, the dielectric layer, and the second silicon layer form an SIS junction, and an electric signal from each of the first and second electric contacts allows a free carrier to be accumulated, removed, or reversed on respective opposite sides of the dielectric layer to modulate a free-carrier concentration sensed by an electric field of an optical signal, wherein a stack structure including the first silicon layer and the second silicon layer has a rib waveguide shape so as to form an optical confinement area, and a slab portion of the rib waveguide includes an area to which a metal electrode is connected as the first electric contact, wherein the slab portion in the area to which the metal electrode is connected is thicker than a surrounding slab portion, and wherein the area to which the metal electrode is connected is located so that a range of a distance from the rib waveguide to the area to which the metal electrode is connected is such that when the distance is changed, an effective refractive index of the rib waveguide in a zeroth-order mode does not change.

The above and other objects, features, and advantages of the present invention will become apparent from the following description based on the accompanying drawings which illustrate exemplary embodiments of the present invention.

DESCRIPTION OF THE EMBODIMENTS OF THE INVENTION

Before description of exemplary embodiments, a portion of a rib waveguide where a slab is connected to an electrode structure will be described.

To allow the refractive index of a silicon waveguide to be changed using the carrier plasma effect, an external voltage needs to be applied to a core portion of the waveguide. To achieve this, an electrode is connected to a portion of the rib waveguide which extends from a slab. Metal such as aluminum (Al) or copper (Cu) is generally used as the electrode. The portion extending from the slab and connected to the electrode is configured with a silicon layer doped with impurities of a high concentration, so as to serve as a contact layer. The portion in which the contact layer and the metal electrode are connected together is configured with a silicide layer to allow the electrode and the contact layer to be reliably electrically connected together.

Figure 1:
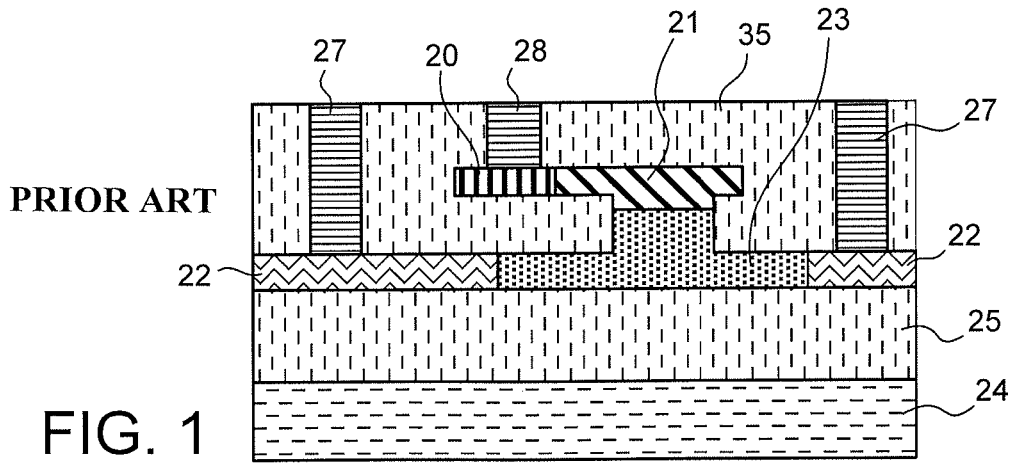
FIG. 1 is a sectional view showing an example of a structure of a silicon-based optical modulator with a pn junction.
Figure 2:
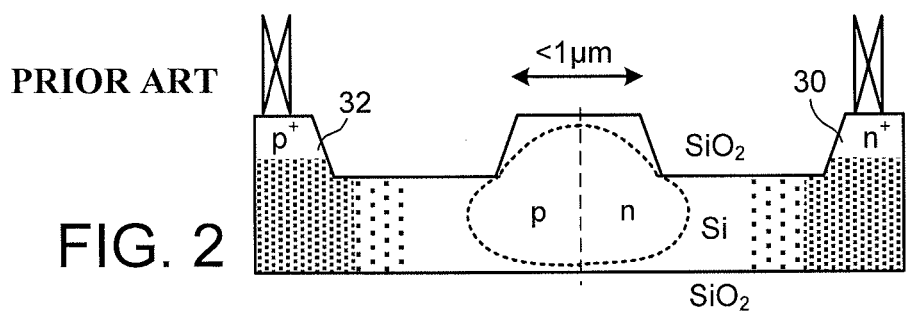
FIG. 2 is a diagram showing an example of a connection structure for the optical modulator and an electrode.
Figure 3:
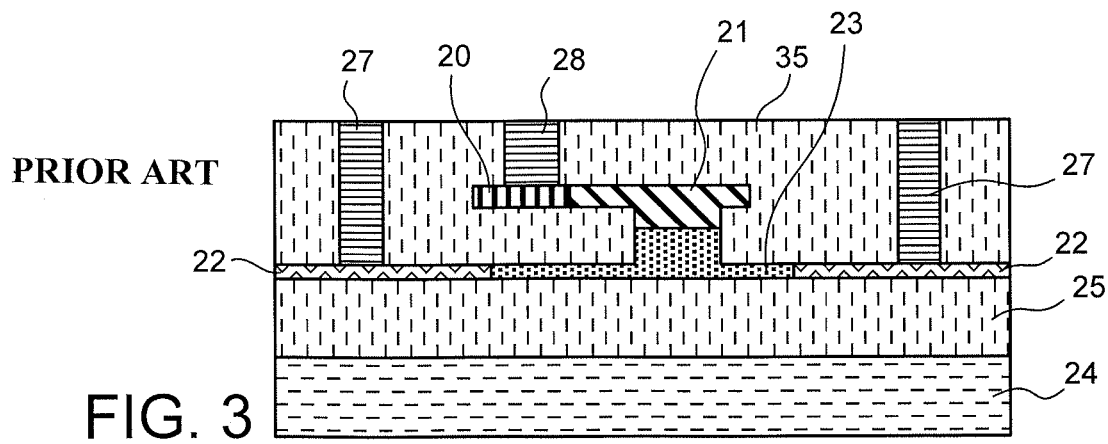
FIG. 3 is a diagram showing another example of the connection structure for the optical modulator and the electrode.

FIG. 3 shows an electro-optic device which is similar to the device shown in FIG. 1 but which includes a contact layer, that is, $p^{++}$-doped silicon layer 22 with the thickness thereof reduced in order to decrease an optical propagation loss in the rib waveguide. In this configuration, since $p^{++}$-doped silicon layer 22 is very thin, when an attempt is made to form an electric contact via the silicide layer for connection to metal electrode 27, the electrical characteristics of the connection may be unstable. Specifically, even though an attempt is made to form silicide layers using the same fabricating process, the thickness may vary among the resultant silicide layers, resulting in an inconstant contact resistance. This is a serious problem.

Figure 4:
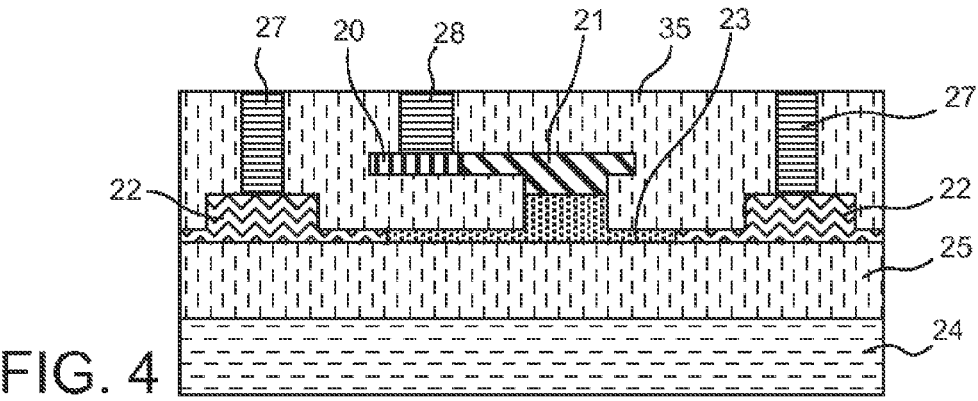
FIG. 4 is a sectional view of the connection structure for the optical modulator and the electrode according to a first exemplary embodiment.

As a solution to the inconstant contact resistance, an example of a configuration of an electro-optic device according to a first exemplary embodiment is shown in FIG. 4. The electro-optic device shown in FIG. 4 is configured so as to serve as, for example, a silicon-based optical modulator.

In the optical modulator shown in FIG. 4, as in the optical modulator shown in FIG. 3, $p^{++}$-doped silicon layer 22 connected to each slab of the rib waveguide is formed to be thin. However, unlike the optical modulator shown in FIG. 3, $p^{++}$-doped silicon layer 22 is formed to be thicker at a position corresponding to the connection to electrode 27. In other words, p++-doped silicon layer 22 is formed so as to have a trapezoidal cross-section near the connection to electrode 27, in the optical modulator shown in FIG. 4.

Since $p^{++}$-doped silicon layer 22 serving as a contact layer is thicker at the connection to electrode 27, a silicide layer can be stably formed at a position corresponding to the interface between $p^{++}$-doped silicon layer 22 and electrode 27. The results of the present inventors' experiments show that a stable contact resistance is obtained when $p^{++}$-doped silicon layer 22 is thicker than the slab portion of the rib waveguide by a range of between 50 nm and 100 nm.

Now, the silicon-based optical modulator shown in FIG. 4 will be described in further detail.

As with the silicon-based optical modulator shown in FIG. 1 or FIG. 3, in the silicon-based optical modulator shown in FIG. 4, oxide layer 25 is provided on silicon substrate 24, and p-doped silicon layer 23 serving as an SOI layer is further provided on oxide layer 25 as the lower half of the rib waveguide by patterning. On the top surface of p-doped silicon layer 23, n-doped silicon layer 21 is provided so as to form a pn junction with p-doped silicon layer 23. In addition, $n^{++}$-doped silicon layer 20 is connected to a side portion of n-doped silicon layer 21. Electrode 28 is connected to $n^{++}$-doped silicon layer 20. Oxide layer 35 also functioning as a clad layer of the rib waveguide is provided to cover all over p-doped silicon layer 23, $p^{++}$-doped silicon layer 22, n-doped silicon layer 21 and $n^{++}$-doped silicon layer 20.

On each of the opposite sides of the rib waveguide which is formed as a projecting portion of the SOI layer, the SOI layer is formed so as to have a thickness of at most 100 nm and to function as a slab layer. Provided on the slab layer is $p^{++}$-doped silicon layer 22 serving as a contact layer which is used for connection to electrode 27. Electrode 27 is composed of, for example, aluminum or copper. In the area in which $p^{++}$-doped silicon layer 22 is joined to electrode 27, $p^{++}$-doped silicon layer 22 is formed to have a thickness larger than the sickness of the slab portion by at least 50 nm.

In this case, the thickness of $p^{++}$-doped silicon layer 22 in the area in which the $p^{++}$-doped silicon layer is joined to electrode 27 is set to be the same as that of the SOI layer on which the rib waveguide has not been patterned yet. Then, processes used to fabricate an optical modulator is simplified. This reduces a variation in contact resistance and contributes to reducing costs.

In this structure, the thin SOI layer which becomes the slab of the rib waveguide is formed adjacent to $p^{++}$-doped silicon layer 22. The distance from the contact portion in which electrode 27 is joined to $p^{++}$-doped silicon layer 22 to the central axis of the rib waveguide is designed such that electrode 27 is electrically connected to the rib waveguide at a sufficiently low resistance. Furthermore, the effective refractive index in the zeroth-order mode of the rib-type optical waveguide structure is designed so as to be independent of the distance from the contact portion of electrode 27 to the central axis of the rib waveguide. This arrangement of electrode 27 and the like allows avoidance of the adverse effect of an optical absorption loss caused by the electrode and the highly doped silicon region, and enables the electrode to be designed so as to maintain an optical propagation mode.

Figure 5:
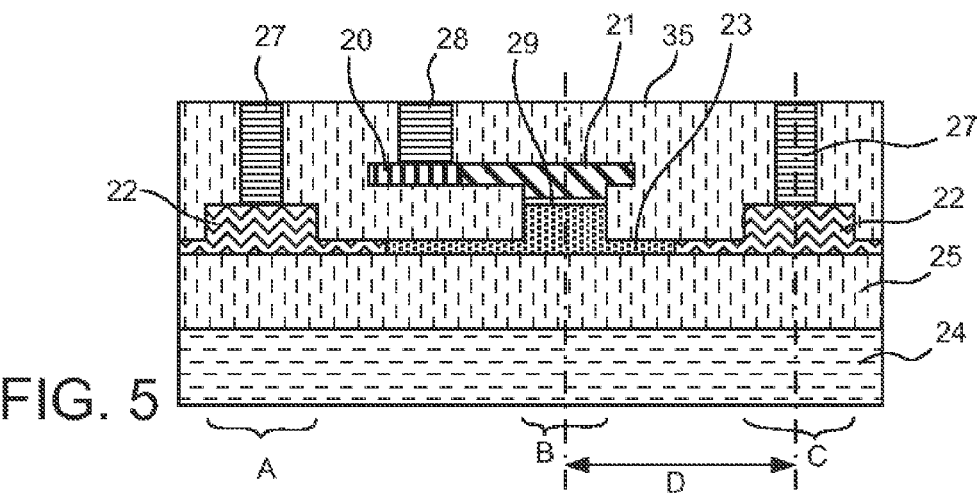
FIG. 5 is a sectional view showing an optical modulator according to a second exemplary embodiment.

FIG. 5 shows an electro-optic device according to a second exemplary embodiment.

To enable the electro-optic device to operate at high speed, an electrode for application of a modulation voltage is preferably arranged in proximity to the modulation portion in which light interacts with carriers in the semiconductor. However, silicon doped with impurities absorbs light, and the electrode arranged in proximity to the modulation portion leads to an increase in optical loss. Thus, realization of high-speed operations is in a tradeoff relationship with a reduction in optical loss. The second exemplary embodiment attempts to find the optimum condition for the electrode arrangement in connection with the tradeoff relationship.

An electro-optic device shown in FIG. 5 is similar to that shown in FIG. 4, but is different from that shown in FIG. 4 in that thin dielectric layer 29 is formed at the interface between doped silicon layers 21 and 23, instead of forming the pn junction at which n-doped silicon layer 21 is connected directly to p-doped silicon layer 23 forming the rib waveguide. That is, this electro-optic device includes an SIS junction.

In this electro-optic device, when an electric signal is applied to between p-doped silicon layer 23 and n-doped silicon layer 21 via electrodes 27 and 28, then, on the respective opposite sides of dielectric layer 29, free carriers are accumulated or removed or the carrier concentration is reversed. As a result, the concentration of free carriers, which acts on the electric field of an optical signal propagating through the rib waveguide is modulated in accordance with the electric signal. Hence, the effective optical refractive index of the waveguide is modulated. In this structure, p-doped silicon layer 23 forms a silicon body area, and n-doped silicon layer 21 forms a gate area. The silicon body area and the gate area, sandwiching thin dielectric layer 29, form an active area of the electro-optic device.

Each projecting portion of $p^{++}$-doped silicon layer 22 to which electrode 27 is joined extends along the longitudinal direction of the rib waveguide to form a parasitic rib. Therefore, the electro-optic device has three silicon blocks A, B and C each extending along the longitudinal direction. Silicon blocks A and C are the highly-doped parasitic ribs each of which is made of $p^{++}$-doped silicon layer 22. Silicon block B is the center rib portion of the rib waveguide.

In FIG. 5, distance D indicates the distance from the contact portion in which electrode 27 is joined to $p^{++}$-doped silicon layer 22 to the central axis of the rib waveguide. In the present exemplary embodiment, distance D serves as a parameter that determines the tradeoff relationship in the electro-optic device between the realization of the high-speed operation and a reduction in optical loss. Varying distance D allows the characteristics of the modulation portion and the surroundings thereof as an optical waveguide to be examined. The point of the present exemplary embodiment is that the characteristics of the surroundings as an optical waveguide are examined to determine the optimum value for the electrode position in connection with the tradeoff relationship.

Figure 6:
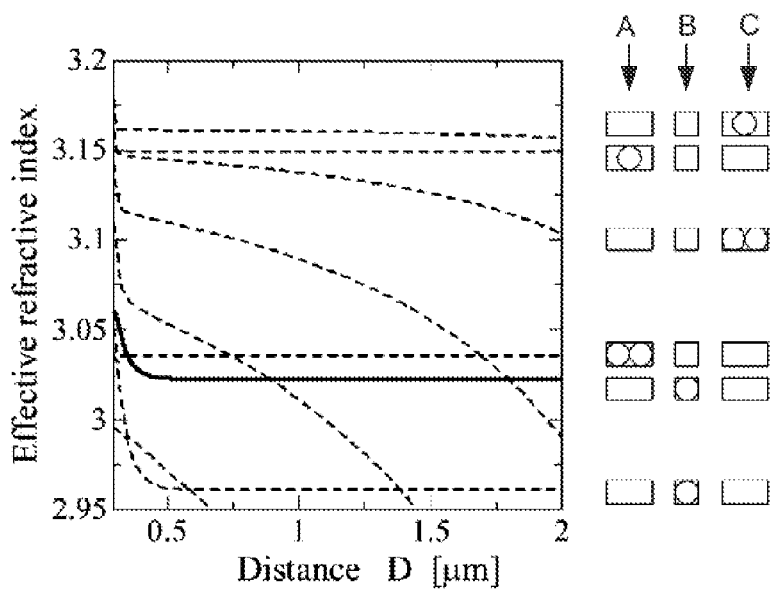
FIG. 6 is a graph showing the dependence of the optical modulator shown in FIG. 5 on the distance to an Si block in an optical waveguide mode.

FIG. 6 is a plot obtained by examining all the optical waveguide modes of silicon blocks in FIG. 5 with respect to varying distance D. In the graph, the axis of ordinate indicates the effective refractive index. The axis of abscissa indicates distance D. Several sets each including three quadrangles, i.e., two rectangles A and C and one square B, are shown in the right side of the graph. The quadrangles A, B and C correspond to the three silicon blocks A, B and C labeled in FIG. 5, respectively. A circle in the quadrangle indicates a propagation mode in which light propagates in the corresponding silicon block (the rib waveguide or parasitic rib). Furthermore, in the graph, a mode in which a modulation operation is to be performed is shown by a solid line. The other modes are shown by dashed lines. Obviously, in the mode in which a modulation operation is to be performed, light propagates through central silicon block B, that is, the rib waveguide.

The following is apparent from the graph in FIG. 6. In the mode shown by a solid line and which is to be used for modulation operation, that is, the mode in which light propagates through the rib waveguide, in a portion of the mode in which the effective refractive index varies depending on distance D, the propagation mode is coupled to the other propagation modes shown by dashed lines. If the propagation mode is coupled to the other propagation modes, the silicon block fails to operate normally as an electro-optic device. Furthermore, even for regions in which curves each indicating the effective refractive index for the corresponding propagation mode depending on distance D cross each other, it is desirable to avoid using some of the regions for which determining whether or not the curves cross each other is difficult. In the present example, provided that distance D is at least about 0.6 μm or more and the vicinity corresponding to distance D=0.7 μm is excluded, then it is possible to predict that coupling to other modes which may result in a loss is prevented, allowing the silicon blocks to operate as a normal waveguide. Thus, the results of the examination clearly indicate where the electrode is to be located so as to lie as close to the rib waveguide as possible with the arrangement of the silicon blocks near the rib waveguide taken into account.

Also in the electro-optic device shown in FIG. 5, distance D is set such that electrode 27 is electrically connected to the rib waveguide at a sufficiently low resistance and such that the effective refractive index in the zeroth-order mode of the rib-type optical waveguide structure is set independently of distance D. This arrangement of electrode 27 and the like allows avoidance of the adverse effect of an optical absorption loss caused by the electrode and the highly doped silicon area, and enables the electrode to be designed so as to maintain the optical propagation mode.

Now, a process of fabricating the electro-optic device shown in FIG. 5, that is, the silicon-based optical modulator, will be described.

Figure 7A:
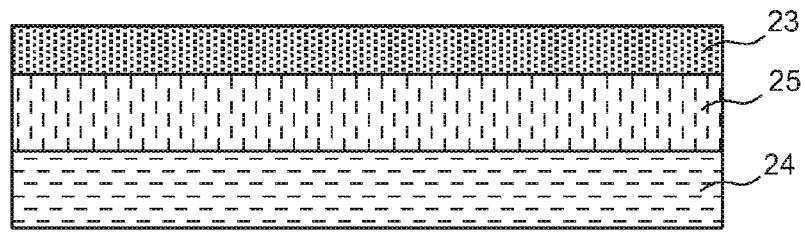
FIGS. 7A to 7F are sectional views sequentially showing a process of fabricating the optical modulator.

FIG. 7A shows the sectional configuration of an SOI substrate used to form an electro-optic device. The SOI substrate is configured such that buried oxide layer 25 is provided on silicon substrate 24, with a silicon layer of thickness about 300 nm stacked on oxide layer 25. To reduce an optical loss, the buried oxide layer preferably has a thickness of at least 1,000 nm. A silicon layer on buried oxide layer 25 is what is called an SOI layer and needs to be p-doped silicon layer 23. Here, assuming that the first and second conductivity types are defined as a p-type and an n-type, respectively, the silicon layer on oxide layer 25 may be doped so as to exhibit the first conductivity type in advance. Alternatively, the following process is possible. After formation of a silicon layer on buried oxide layer 25, phosphorous (P) or boron (B) is doped into the surface layer of the silicon layer by ion implantation or the like. Thereafter, the resultant substrate is subjected to thermal treatment so as to diffuse p-type impurities throughout the silicon layer, thus forming the silicon layer into p-doped silicon layer 23.

Figure 7B:
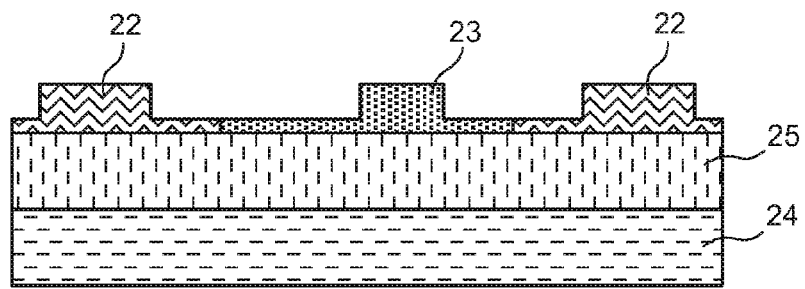

Then, as shown in FIG. 7B, a resist pattern is formed on the surface of p-doped silicon layer 23, and a reactive etching process is applied to the resist pattern to process p-doped silicon layer 23 into a rib waveguide shape. Furthermore, an area with p-type dopant of a high concentration doped therein is formed into $p^{++}$-doped silicon layer 22, which is a silicon block portion located adjacent to the rib waveguide structure.

Figure 7C:
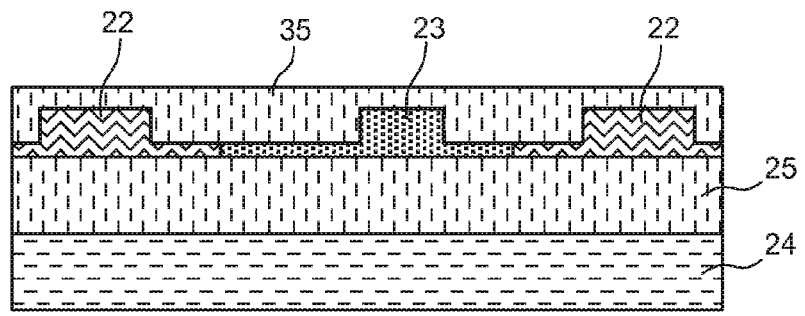

Then, as shown in FIG. 7C, oxide layer 35 used as a clad layer is formed by depositing an $SiO_2$ film of thickness 300 to 700 nm all over $p^{++}$-doped silicon layer 23 and $p^{++}$-doped silicon layer 22. Then, oxide layer 35 is flattened by a technique such as CMP (Chemical-Mechanical Polishing process) so as to control the height of the rib waveguide.

Figure 7D:
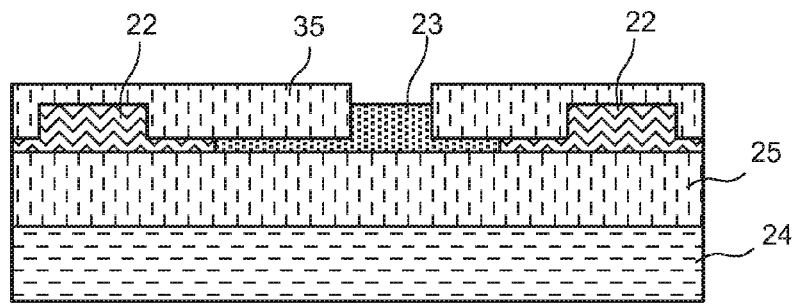

Next, as shown in FIG. 7D, a resist mask pattern is formed on the surface of oxide layer 35 processed by CMP, and the reactive etching process is applied to the resist mask pattern to form a trench corresponding to the position of the rib waveguide, in the oxide clad layer. Then, p-doped silicon layer 23 serving as the core portion of the rib waveguide is exposed from the bottom surface of the trench.

Figure 7E:
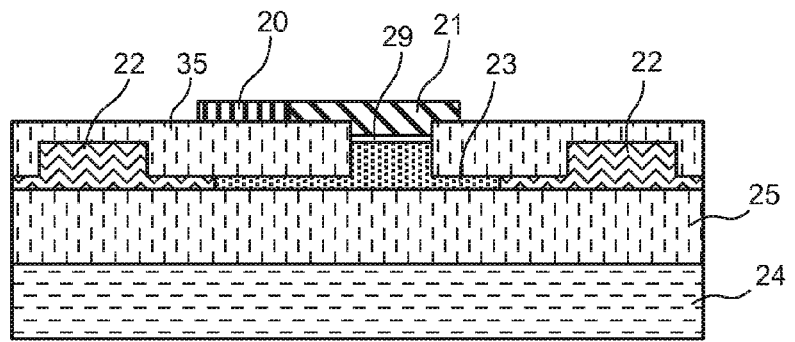

The mask layer used for the patterning is removed. Then, as shown in FIG. 7E, a silicon oxide layer that is relatively thin dielectric layer 29 is formed on the SOI layer, that is, exposed p-doped silicon layer 21, by thermal oxidation treatment. Dielectric layer 29 may be, instead of the silicon oxide layer, for example, a silicon nitride layer, any other high dielectric-constant (high-k) insulating layer, or a stack of these layers. Thereafter, a polycrystalline silicon layer is deposited to form n-doped silicon layer 21, and n$^{++}$-doped silicon layer 20 is formed in an electrode extracting portion of n-doped silicon layer 21.

Figure 7F:
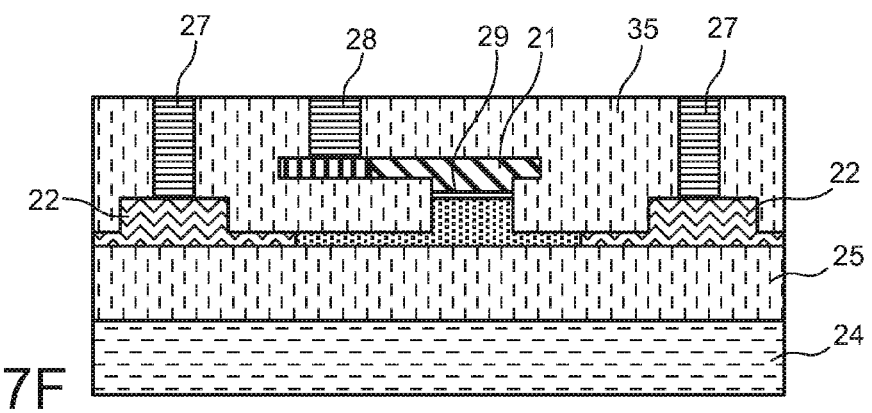

Finally, as shown in FIG. 7F, oxide layer 35 as the clad layer is further deposited such that all the layers including n$^{++}$-doped silicon layer 20 and n-doped silicon layer 21 are covered with the oxide clad layer. Then, the surface of oxide layer 35 is flattened by CMP and contact holes are formed such that electrodes 27 and 28 can be taken out through the contact holes. As a result, n$^{++}$-doped silicon layer 20 and p$^{++}$-doped silicon layer 22 are exposed from the bottom surfaces of the contact holes. Thus, nickel (Ni) is deposited on the exposed portions of n$^{++}$-doped silicon layer 20 and p$^{++}$-doped silicon layer 22 to form a silicide layer. Moreover, an electrode layer composed of TaN/Al (Cu) or the like is formed in each of the contact holes to complete electrodes 27 and 28. Electrodes 27 and 28 are used for connection to a driving circuit.

The whole or part of the exemplary embodiments disclosed above can be described as, but not limited to, the following supplementary notes.

(Supplementary note 1) A silicon-based electro-optic device comprising:
 a silicon body region doped to exhibit a first conductivity type;
 a silicon gate region doped to exhibit a second conductivity type, the silicon gate region being disposed at least in part over the silicon body region to define a contiguous area between the silicon body region and the silicon gate region;
 a dielectric layer disposed in the contiguous area between the silicon body region and the silicon gate region, the combination of the silicon body region and the silicon gate region with the interposed dielectric layer defining an active region of the electro-optic devices;
 a first electrical contact coupled to the silicon gate region; and
 a second electrical contact coupled to the silicon body region,
 wherein upon application of an electrical signal to the first electrical contact and the second electrical contact, free carriers accumulate, deplete or invert within the silicon body region and the silicon gate region on both sides of the dielectric layer at the same time, such that an optical electric field of the optical signal substantially overlaps with a modulation area of free carrier concentration in the active region of the electro-optic device,
 a rib waveguide is formed by means of the silicon body region, the silicon gate region and the dielectric layer,
 a first electrical contact is coupled to a slab part of the rib waveguide,
 a rib part of the rib waveguide has a region coupled to an electrode contact region where thickness of the electrode contact region of the rib part is thicker than around the rib part, and
 a position of the electrode contact region of the rib part is located at a position of center of the waveguide where an effective index value of the rib waveguide in a zeroth-order mode is constant when the distance between the rib waveguide and the electrode contact region varies.

(Supplementary note 2) The silicon-based electro-optic device as defined in Supplementary note 1, wherein a thickness of the electrode contact region of the rib part is the same as a thickness of the rib waveguide.

(Supplementary note 3) The silicon-based electro-optic device as defined in Supplementary note 1, wherein a thickness of the electrode contact region of said rib part is the same as a thickness at least in part of an SOI region of the rib waveguide (Supplementary note 4) The silicon-based electro-optic device as defined in Supplementary note 1, wherein a width of electrode contact region of the rib part is wider than a width of the rib waveguide.

(Supplementary note 5) An electro-optic device comprising:
 a first silicon layer of a first conductivity type;
 a second silicon layer of a second conductivity type different from the first conductivity type, the second silicon layer being at least partly stacked on the first silicon layer;
 a dielectric layer formed at an interface between the first silicon layer and the second silicon layer;
 a first electric contact connected to the first silicon layer; and
 a second electric contact connected to the second silicon layer,
 wherein the first silicon layer, the dielectric layer, and the second silicon layer form an SIS junction, and an electric signal from each of the first and second electric contacts allows a free carrier to be accumulated, removed, or reversed on respective opposite sides of the dielectric layer to modulate a free-carrier concentration sensed by an electric field of an optical signal,
 wherein a stack structure including the first silicon layer and the second silicon layer has a rib waveguide shape so as to form an optical confinement area, and a slab portion of the rib waveguide includes an area to which a metal electrode is connected as the first electric contact,
 wherein the slab portion in the area to which the metal electrode is connected is thicker than a surrounding slab portion, and
 wherein the area to which the metal electrode is connected is located so that a range of a distance from the rib waveguide to the area to which the metal electrode is connected is such that when the distance is changed, an effective refractive index of the rib waveguide in a zeroth-order mode does not change.

(Supplementary note 6) The electro-optic device as defined in Supplementary note 5, further comprising a silicon substrate and a buried oxide layer formed on the silicon substrate, wherein the first silicon layer is provided on the buried oxide layer so as to serve as an SOI layer.

(Supplementary note 7) The electro-optic device as defined in Supplementary note 5 or 6, wherein a slab thickness in the area to which the metal electrode is connected is the same as one of heights of the first silicon layer in the rib waveguide.

(Supplementary note 8) The electro-optic device as defined in Supplementary note 5 or 6, wherein a slab width in the area to which the metal electrode is connected is larger than the width of the first silicon layer in the rib waveguide.

(Supplementary note 9) The electro-optic device as defined in Supplementary note 5, wherein the slab thickness in the area to which the metal electrode is connected is at least 70 nm.

(Supplementary note 10) The electro-optic device as defined in Supplementary note 5, wherein the distance at which the effective refractive index does not change is at least one third of a wavelength and at most two-thirds of the wavelength.

It will be apparent that other variations and modifications may be made to the above described embodiments and functionality, with the attainment of some or all of their advantages. It is an object of the appended claims to cover all such variations and modifications as come within the true spirit and scope of the invention.

What is claimed is:

1. A silicon-based electro-optic device comprising: a silicon body region doped to exhibit a first conductivity type; a silicon gate region doped to exhibit a second conductivity type, disposed at least in part over the silicon body region to define a contiguous area between the silicon body region and the silicon gate region; a dielectric layer disposed in the contiguous area between the silicon body region and the silicon gate region so that the combination of the silicon body region, the silicon gate region, and the interposed dielectric layer define an active region of the electro-optic device; a first electrical contact coupled to the silicon gate region; and a second electrical contact coupled to the silicon body region, wherein: upon application of an electrical signal to the first electrical contact and the second electrical contact, free carriers accumulate, deplete or invert within the silicon body region and the silicon gate region on both sides of the dielectric layer at the same time, such that an optical electric field of the optical signal substantially overlaps with a modulation area of free carrier concentration in the active region of the electro-optic device, a rib waveguide is formed by means of the silicon body region, the silicon gate region and the dielectric layer, the second electrical contact is coupled to a slab part of the rib waveguide via a rib electrode contact region, thickness of the rib electrode contact region being thicker than around a rib part of the rib waveguide, the rib part has a region coupled to an electrode contact region where thickness of the electrode contact region of the rib part is thicker than around the rib part, and a position of the rib electrode contact region of the rib part is located at a position apart from a center of the rib waveguide where an effective index value of the rib waveguide in a zeroth-order mode is constant when the distance between rib waveguide and the rib electrode contact region varies.

2. The silicon-based electro-optic device as defined in claim 1, wherein a thickness of the rib electrode contact region of the rib part is the same as a thickness of the rib waveguide.

3. The silicon-based electro-optic device as defined in claim 1, wherein a thickness of the rib electrode contact region of said rib part is the same as a thickness at least in part of a silicon-on-insulator (SOI) region of the rib waveguide.

4. The silicon-based electro-optic device as defined in claim 1, wherein a width of the rib electrode contact region of the rib part is wider than a width of the rib waveguide.

* * * * *

UNITED STATES PATENT AND TRADEMARK OFFICE
CERTIFICATE OF CORRECTION

PATENT NO. : 8,532,440 B2  
APPLICATION NO. : 13/036244  
DATED : September 10, 2013  
INVENTOR(S) : Jun Ushida et al.

Page 1 of 1

It is certified that error appears in the above-identified patent and that said Letters Patent is hereby corrected as shown below:

On the Title Page

(73) Assignee: NEC Corporation, Tokyo (JP) should appear as follows:

(73) Assignee: NEC Corporation, Tokyo (JP)

Assignee: Agency for Science, Technology and Research, Singapore (SG).

Signed and Sealed this
Nineteenth Day of August, 2014

Michelle K. Lee
*Deputy Director of the United States Patent and Trademark Office*